United States Patent
Pedrami et al.

(10) Patent No.: US 10,323,965 B2
(45) Date of Patent: Jun. 18, 2019

(54) ESTIMATING SYSTEM PARAMETERS FROM SENSOR MEASUREMENTS

(71) Applicant: PRATT & WHITNEY CANADA CORP., Longueuil (CA)

(72) Inventors: Reza Pedrami, Montreal (CA); Kaveh Moezzi Madani, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 293 days.

(21) Appl. No.: 14/936,994

(22) Filed: Nov. 10, 2015

(65) Prior Publication Data

US 2017/0131123 A1  May 11, 2017

(51) Int. Cl.
  G01D 18/00 (2006.01)
  G05B 13/04 (2006.01)
  G01D 5/244 (2006.01)

(52) U.S. Cl.
  CPC ........... *G01D 18/00* (2013.01); *G01D 5/2449* (2013.01); *G01D 5/24452* (2013.01); *G01D 5/24471* (2013.01); *G01D 5/24476* (2013.01); *G05B 13/04* (2013.01)

(58) Field of Classification Search
  None
  See application file for complete search history.

(56) References Cited

U.S. PATENT DOCUMENTS

| 4,024,463 | A | * | 5/1977 | Pelley | H03G 3/3005 |
| | | | | | 330/138 |
| 4,096,699 | A | * | 6/1978 | Zitelli | F01D 17/24 |
| | | | | | 251/129.04 |
| 5,303,616 | A | * | 4/1994 | Palansky | F16H 61/143 |
| | | | | | 192/3.31 |
| 5,315,819 | A | * | 5/1994 | Page | F02C 9/28 |
| | | | | | 416/30 |
| 7,603,222 | B2 | | 10/2009 | Wiseman et al. | |
| 7,742,904 | B2 | | 6/2010 | Healy et al. | |
| 7,861,578 | B2 | | 1/2011 | Adibhatla et al. | |
| 8,924,190 | B2 | | 12/2014 | Djelassi | |
| 2001/0025819 | A1 | * | 10/2001 | Bowser | B01D 61/24 |
| | | | | | 210/640 |
| 2005/0140318 | A1 | * | 6/2005 | Wang | H02P 6/182 |
| | | | | | 318/400.34 |
| 2007/0205736 | A1 | | 9/2007 | Lindberg et al. | |
| 2009/0018746 | A1 | | 1/2009 | Miller et al. | |
| 2012/0283849 | A1 | | 11/2012 | Kureemun | |
| 2014/0175982 | A1 | * | 6/2014 | Yao | H05B 37/03 |
| | | | | | 315/119 |

(Continued)

OTHER PUBLICATIONS

C. Bessai, Emissions Reduction Potential of Closed-Loop Intake Oxygen Control, Sep. 4-7, 2013. Tokyo, Japan, p. 107-108.*

(Continued)

*Primary Examiner* — Tung S Lau (74) *Attorney, Agent, or Firm* — Norton Rose Fulbright Canada LLP (57) ABSTRACT

There are described herein methods and systems for estimating a system parameter in a closed loop scheme using a sensor model associated with a sensor performing a measurement of the system parameter. Past and current measurements of the parameter are used to provide an initial estimate of the system parameter and sensor dynamics are used to refine the estimated parameter.

16 Claims, 7 Drawing Sheets

(56) References Cited

U.S. PATENT DOCUMENTS

2014/0359367 A1    12/2014  Friman et al.
2015/0059660 A1*    3/2015  Cocuzza ................. F01K 9/003
                                                     122/406.4
2015/0113996 A1     4/2015  Cai et al.

OTHER PUBLICATIONS

Tianpu Dong, Model-Based State Feedback Controller Design for a Turbocharged Diesel Engine with an EGR System, Published: May 28, 2015, p. 5018-5039.*

* cited by examiner

ESTIMATING SYSTEM PARAMETERS FROM SENSOR MEASUREMENTS

TECHNICAL FIELD

The present invention relates generally to methods and systems for measuring parameters using sensors, and more particularly to estimating system parameters when sensor measurements exhibit time delays due to slow response times of the sensor.

BACKGROUND OF THE ART

Many sensors cannot measure rapid changes in a given parameter, such as temperature or pressure, as they exhibit time delays. This is problematic in engine control systems when data from the sensor is used to make engine decisions. For example, in a gas turbine engine, temperature sensors are located at the exhaust duct. At this location, shielding is required that will slow down the time response of the temperature sensor.

Electronic engine control systems sometimes compensate the slow dynamics of the temperature sensor by introducing lead or derivative type compensation in inter turbine temperature limiting loops. However, this type of controller has to be designed on a case-by-case basis and its tuning is very time-consuming. Other compensation methods are also known, but they are susceptible to noise, require additional components, and in some cases involve linking the measured parameter to a specific engine dynamic, which is not always feasible.

There is therefore a need to improve on techniques used to correct measurement signals from sensors.

SUMMARY

There are described herein methods and systems for estimating a system parameter in a closed loop scheme using a sensor model associated with a sensor performing a measurement of the system parameter. Past and current measurements of the parameter are used to provide an initial estimate of the system parameter and sensor dynamics are used to refine the estimated parameter.

In accordance with a first broad aspect, there is provided a method for estimating a system parameter measured by a sensor, the method comprising receiving a measured parameter signal from the sensor, the measured parameter signal corresponding to a current measurement of the system parameter; and in a closed-loop scheme, generating an estimated parameter signal based on the measured parameter signal and on past measurements of the system parameter; outputting the estimated parameter signal as an estimate of the system parameter; and iteratively correcting the estimated parameter signal using pre-characterized sensor dynamics for the sensor from which the system parameter is received until a steady state is reached, each corrected iteration of the estimated parameter signal being output as the estimated parameter signal.

In accordance with another broad aspect, there is provided a device for estimating a system parameter measured by a sensor. The device comprises a memory having stored thereon program code executable by a processor and/or at least one processor configured for executing the program code. The program code and/or the circuit is configured for receiving a measured parameter signal from the sensor, the measured parameter signal corresponding to a current measurement of the system parameter, and in a closed loop scheme, generating an estimated parameter signal based on the measured parameter signal and on past measurements of the system parameter; outputting the estimated parameter signal as an estimate of the system parameter; and iteratively correcting the estimated parameter signal using pre-characterized sensor dynamics for the sensor from which the system parameter is received until a steady state is reached, each corrected iteration of the estimated parameter signal being output as the estimated parameter signal.

In accordance with yet another broad aspect, there is provided a device for estimating a system parameter measured by a sensor, the device comprising means for receiving a measured parameter signal from the sensor; means for generating an estimated parameter signal based on the measured parameter signal and on past measurements of the system parameter; means for calculating a model-based parameter signal from the estimated parameter signal using pre-characterized sensor dynamics for the sensor from which the system parameter is received; means for determining an estimation error by subtracting the model-based parameter signal from the measured parameter signal; means for correcting the estimated parameter signal using the estimation error to generate a corrected estimated parameter signal; and means for outputting the corrected estimated parameter signal as an estimate of the system parameter.

In present description, the expression "closed loop scheme" should be understood to refer to a control system which uses a feedback control action in order to reduce errors within the system. A part of the output signal is fed back to the input for comparison with a desired set point condition, and the error is converted into a control action designed to bring the system to a desired response.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

There is described herein methods and systems for estimating system parameters from actual sensor measurements. System parameters are estimated in order to account for a sensor's inability to measure a rapid change in the parameter. The system parameter may be any physically measurable parameter, such as but not limited to, temperature, pressure, speed, position, load, flow rate, voltage, distance, and acceleration. The sensor may be any type of sensor that is capable of measuring a system parameter, such as but not limited to, thermal, heat and temperature sensors; pressure sensors; force, density and level sensors; and flow and fluid velocity sensors.

Known or pre-determined sensor dynamics are used to estimate the sensor measurement. The methods and systems are applicable to a variety of applications. Examples of applications include engine control systems, such as those for gas turbine engines and more specifically, for turbo shaft engines, turbo propeller engines, and turbo fan engines. For example, the sensor may be used to measure inlet and/or exhaust temperature of a gas turbine engine. Other examples of applications include HVAC (Heating, Ventilation, Air Conditioning) control systems, fuel cells, pumps, drills, vehicles, or any other type of machine through which gases or liquids circulate and from which measurements may be obtained.

Figure 1:
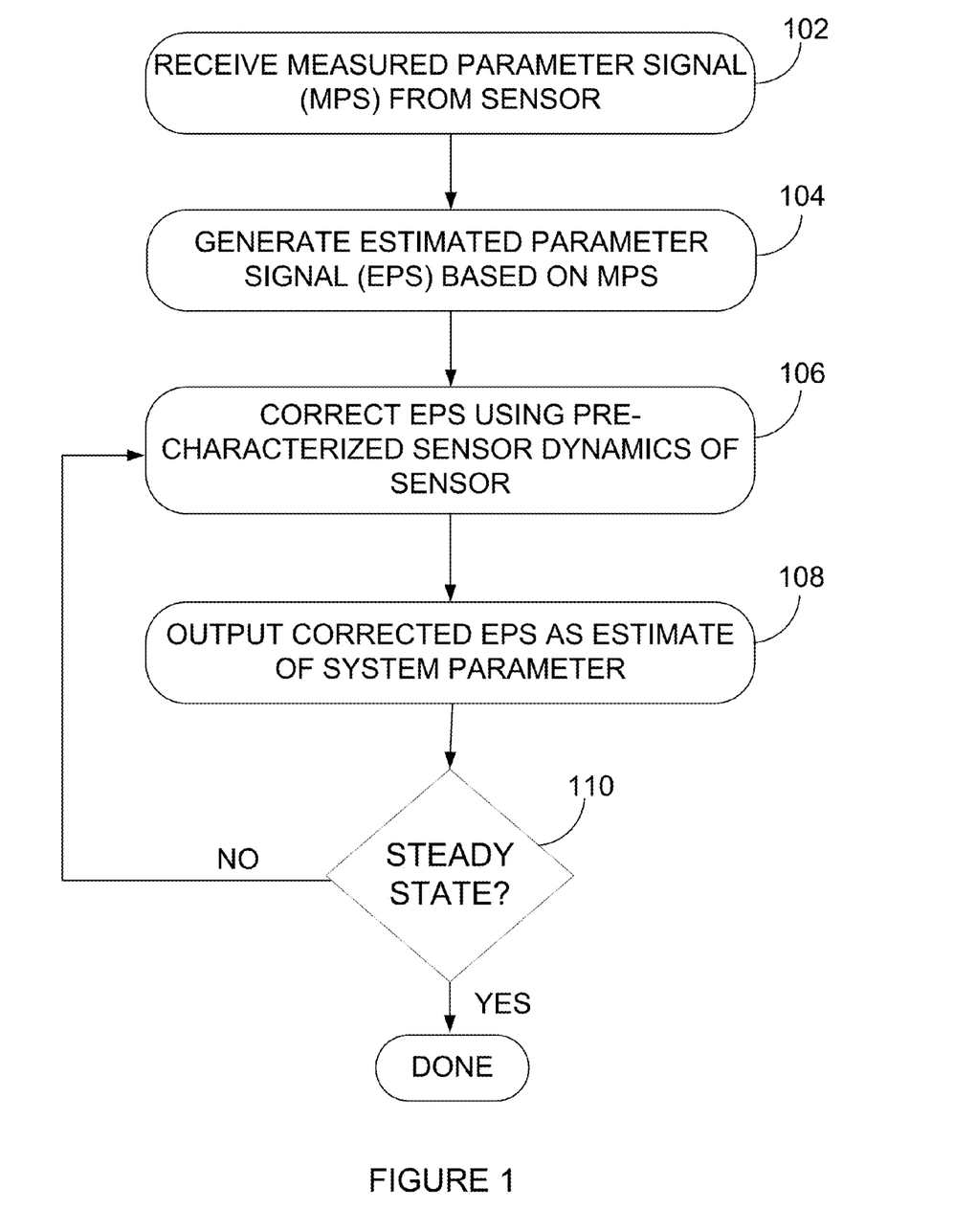
FIG. 1 is a flowchart of an embodiment of a method for estimating a system parameter measured by a sensor.

Referring to FIG. 1, there is illustrated a flowchart of an exemplary method for estimating a system parameter. At 102, a measured parameter signal (MPS) is received from a sensor. The MPS corresponds to a current measurement of the system parameter. For example, if the system parameter is the exhaust gas temperature captured by what is commonly referred to as a T6 thermocouple, the received MPS is the temperature as currently measured by the T6 thermocouple. At 104, an estimated parameter signal (EPS) is generated based on the MPS and on past measurements of the system parameter. At 106, 108, 110 the EPS is iteratively refined (or corrected) using pre-characterized sensor dynamics for the sensor from which the system parameter was measured, until a steady-state is reached. At 108, the corrected EPS is output as the estimate of the system parameter.

Figure 2:
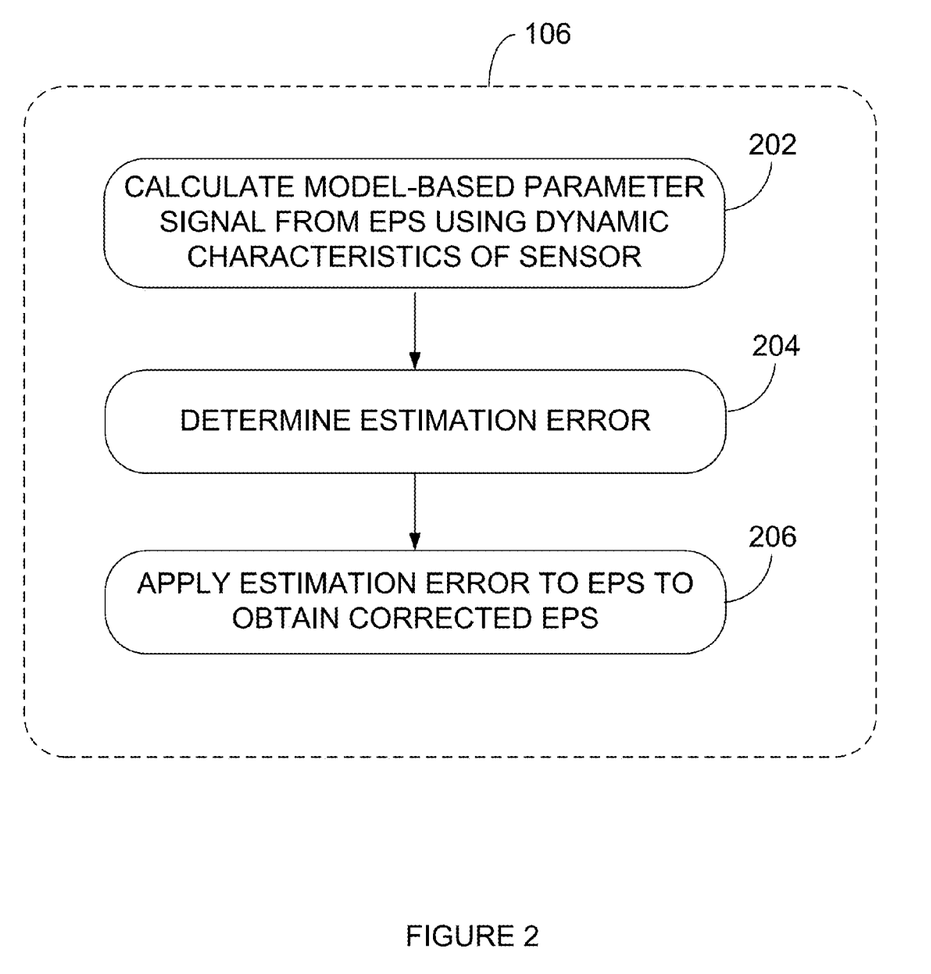
FIG. 2 is a flowchart of an embodiment for iteratively refining the estimated parameter signal using sensor dynamics.

FIG. 2 is a flowchart of an exemplary embodiment for the iterative correction of the EPS, as per 106 of FIG. 1. In this example, the iterative correction is performed by calculating a model-based parameter signal from the EPS using the dynamic characteristics of the sensor, as per 202. At 204, an estimation error is determined by comparing the model-based parameter signal with the MPS. At 206, the estimation error is applied to the EPS to obtain a corrected EPS.

Figure 3:
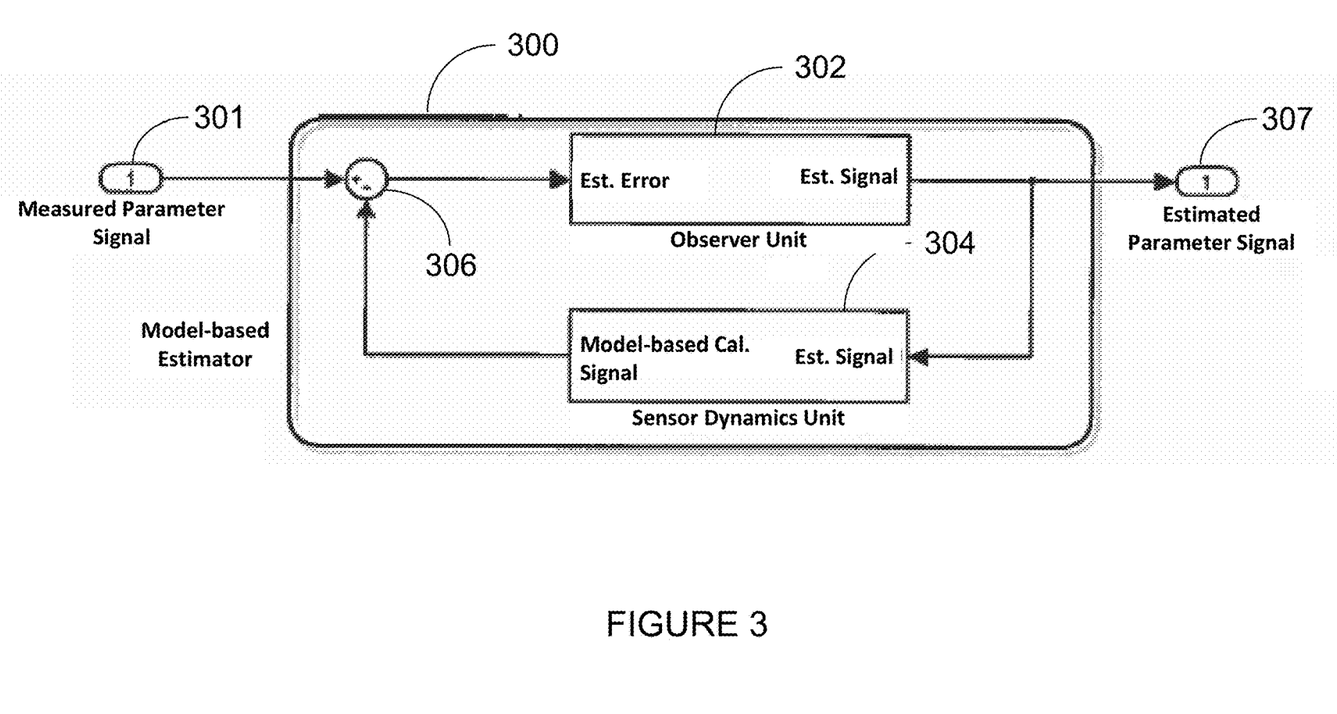
FIG. 3 is a block diagram of an embodiment for an estimator.

The method of FIGS. 1 and 2 will be explained in more detail with regards to FIG. 3, which is a block diagram of an embodiment for estimating the system parameter. The MPS is received at input 301 and provided to the system 300, which is referred to herein as an estimator. The estimator 300 provides a corrected EPS at output 307. An observer unit 302 receives the MPS at the first iteration of the process, generates the EPS based on the MPS and on past measurements of the system parameter, and provides the EPS to a sensor dynamics unit 304. The sensor dynamics unit 304 calculates the model-based parameter signal which is output and returned to the observer unit 304 via a negative feedback loop. In the embodiment illustrated, a comparator 306 is used to determine the estimation error, by subtracting the model-based parameter signal from the MPS. The estimation error is then applied to the EPS by the observer unit 302 in order to obtain the corrected EPS. Note that the estimation error may be determined using other known means once the model-based parameter signal has been calculated, and may be performed by the observer unit 302 or by the sensor dynamics unit 304.

The estimator 300 is thus represented by a closed-loop system, with the observer unit 302 corresponding to the open-loop gains of the system and is the forward path, and the sensor dynamics unit 304 representing the gain of the sensor in the feedback path. The comparator 306 is the summing point between the feedback loop and the system's input.

Figure 4:
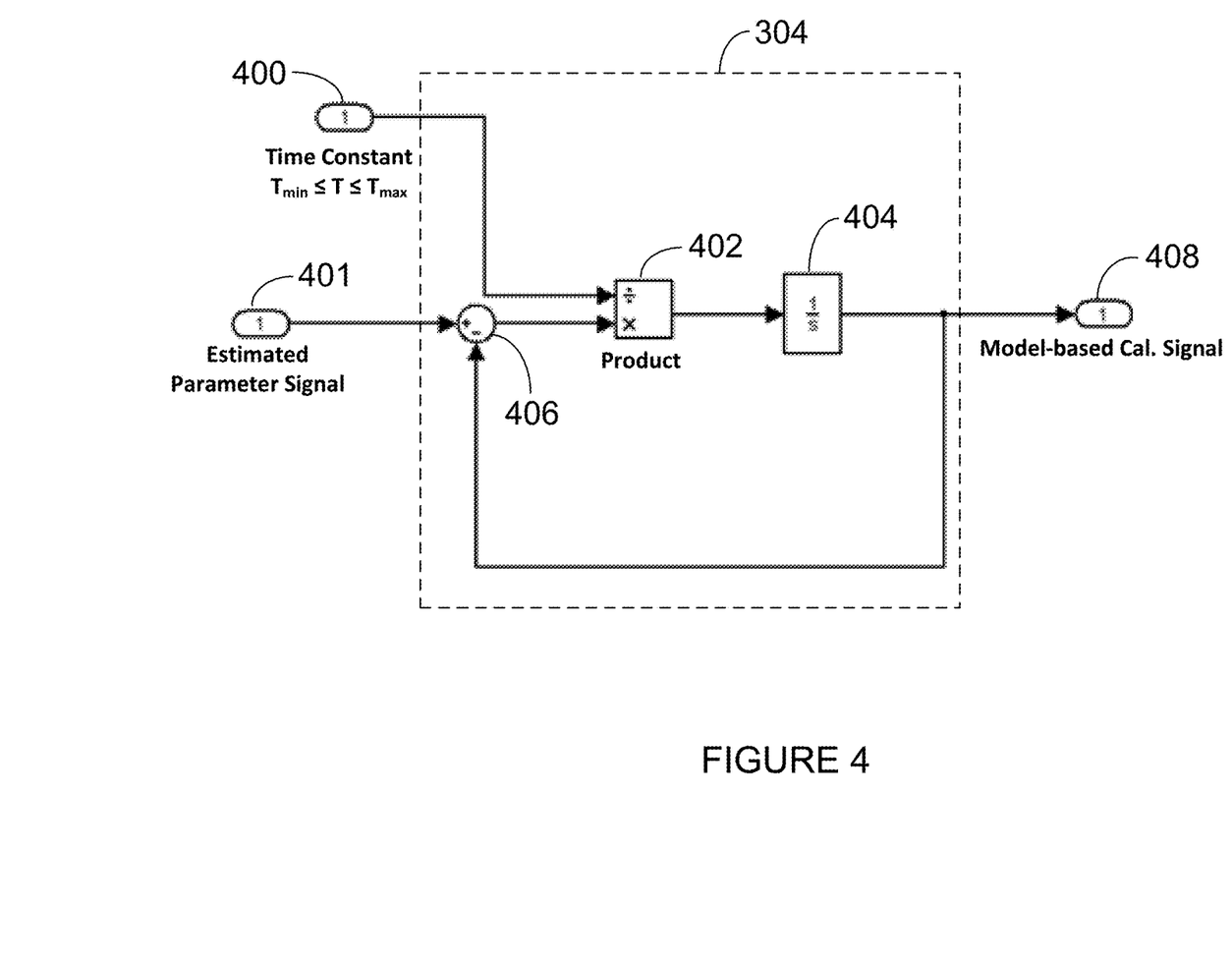
FIG. 4 is a block diagram of an embodiment for a sensor dynamics unit.

FIG. 4 is an exemplary embodiment of the sensor dynamics unit 304, for a thermocouple sensor. In this case, the sensor dynamics may be represented by a first order system H(s) having a time constant $\tau$ that may be any value between $\tau_{min}$ and $\tau_{max}$. The behavior of the estimated value can be tailored to the required characteristic by fine-tuning of the time constant. For example, setting the time constant to $\tau_{max}$ may be recommended when it is desired to characterize the maximum possible peak value of the actual temperature. Since the gain of the observer unit 302 may be designed subject to stability and performance, there is no need to redesign the observer unit 302 when the time constant is changed from $\tau_{min}$ to $\tau_{max}$. An exemplary first order system is thus presented as:

$$H(s) = \frac{1}{\tau s + 1}$$

In the example illustrated in FIG. 4, a linear model of the sensor is utilized to calculate the model-based parameter throughout the operating envelop of the engine. The time constant is received at input 400. The EPS is received at input 401 and in a first iteration, a multiplier 402 outputs a product of (estimated parameter)*(time constant). An integrator 404 integrates the product to obtain output 408. A negative feedback loop subtracts the integrated product from the original estimated parameter via a comparator 406 and sends the result through the multiplier 402 and integrator 404 again. The model-based parameter signal is provided at output 408.

The sensor dynamics unit 304 may also be implemented differently, for example by replacing the sensor model H(s) illustrated above with a more complex model, such as a higher order model or a nonlinear model. In some embodiments, the sensor is a temperature sensor that has a nonlinear characteristic that is modeled by piece-wise linearization throughout an operating envelop of the gas turbine engine. The higher the fidelity of the sensor model, the greater the accuracy of the estimation provided at the output 307 of the estimator 300. In some embodiments, the sensor dynamics unit 304 uses bounded characteristics of the sensor. The observer unit 302 may then be designed to stay within these boundaries.

Figure 5:
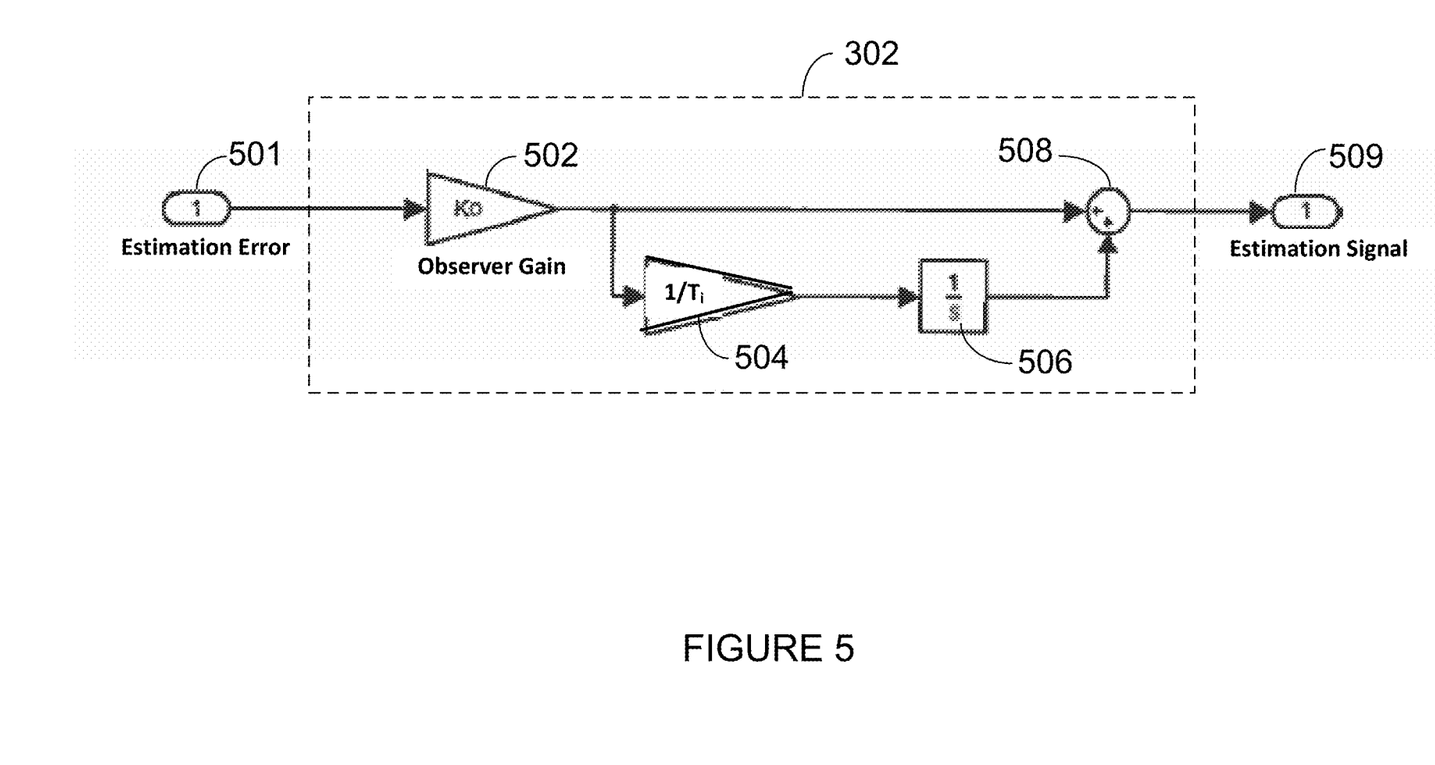
FIG. 5 is a block diagram of an embodiment for an observer unit.

FIG. 5 is an exemplary embodiment of the observer unit 302. The observer unit 302 modulates its estimation as a function of the estimation error. As the estimation error decreases, the estimation is refined. The estimation error is received at input 501 and amplified by amplifier 502, which has a gain of $K_o$. The output of amplifier 502 is transmitted to another amplifier 504 having a gain inversely proportional to a correcting factor $T_i$. The output of amplifier 504 is integrated by integrator 506 and added to the output of amplifier 502 via summer 508, thus providing the EPS. The convergence speed of the observer unit 302 may be adjusted via the gain $K_o$ of amplifier 502, i.e. the calculated model-based parameter signal converges faster to the measured parameter signal by increasing the gain $K_o$. The correcting factor $T_i$ may be used to force the estimation error to zero in steady state. In addition, tuning $T_i$ may also be used to control how fast the estimation error goes to zero.

The sensor dynamic, more specifically the sensor time constant, may be subject to change at different operating conditions. For example, the time constant of a thermocouple varies with air mass flow around the sensor. Therefore, the sensor time constant will vary from $\tau_{min}$ to $\tau_{max}$ at different operating conditions. The gains of the observer unit 302 ($K_o$, $T_i$) may be designed in a way that provides stability to the closed-loop estimator with regards to changes in the time constant of the sensor dynamics unit 304. The time constant of the sensor dynamics unit 304 can be changed in order to tailor the behavior of the estimated signal to the required design characteristic. Moreover, the estimator 300 may preserve its high performance while subject to changes to the time constant. To achieve the robustness and high performance of the estimator 300, the following optimization may be solved to obtain estimator gains ($K_o$, $T_i$).

$$\min \int_0^\infty e^T(t) Q e(t) dt \quad (1a)$$

Subject to $$\tau_{min} \leq \tau \leq \tau_{max} \quad (1b)$$

$$|G_{observer} \times H(s)|_\infty \leq 1 \quad (1c)$$

Where $$G_{Observer} = K_o \left(1 + \frac{1}{T_i s}\right),$$

e(t) is an error vector, and Q is a semi-positive definite matrix. In the exemplary embodiment, e(t) is an estimation error and Q is a positive scalar. Equation (1a) provides a high performance for the estimator 300 with gains ($K_o$, $T_i$) while it is constrained with minimum and maximum bounds on the time constant (equation 1b). Equation (1c) provides the stability of the closed loop estimator. It should be noted that the performance equation is not limited to (1a) as It can be tailored based on design objectives.

In the example illustrated in FIG. 5, a Proportional-Integral (PI) controller is used to implement the observer unit 302, but alternative embodiments, such as higher order compensators, may also be used.

Figure 6:
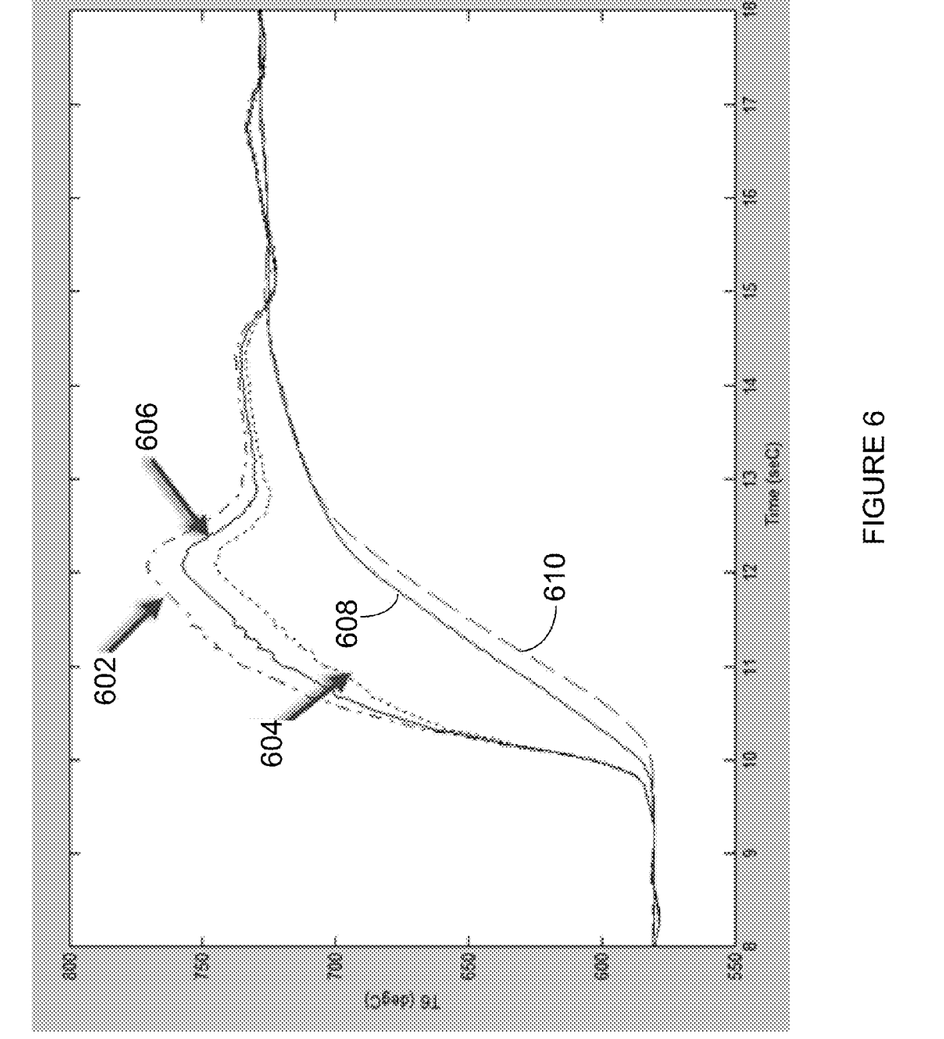
FIG. 6 is a graphical illustration of a measured, estimated, and calculated parameter versus time.

FIG. 6 is a graphical representation of an estimated parameter 606, measured parameter 608, and calculated model-based parameter 610, as a function of time, in accordance with the embodiments of the estimator 300 illustrated in FIGS. 4 and 5. Note that estimated parameter 606 corresponds to a designed time constant, as per the above. Also illustrated is the estimated parameter 602 with the time constant set as $\tau_{max}$ as well as the estimated parameter 604 with the time constant set as $\tau_{min}$. While the parameter in the example of FIG. 6 is temperature, it may also be another parameter, such as pressure.

As shown, a temperature overshoot that occurs at about the twelve second mark is captured by the estimated parameter 606 but not by the measured parameter 608, where the fast rise in temperature is masked by the slow response time of the sensor. The difference between the measured parameter 608 and the calculated model-based parameter 610 corresponds to the estimation error, which is applied to refine the estimated parameter 606. The estimation error is reduced until the estimated parameter 606, the measured parameter 608, and the calculated model-based parameter 610 eventually converge, around the fifteen second mark. Note that the technique described herein is not susceptible to noise, contrary to other correction techniques such as using inverse sensor dynamics to eliminate sensor lag. The optimal design allows the estimator 300 to keep the noise at an appropriate level. Indeed, the noise level can be lowered by lowering the convergence speed of the calculated model-based parameter signal to the measured parameter signal.

Figure 7:
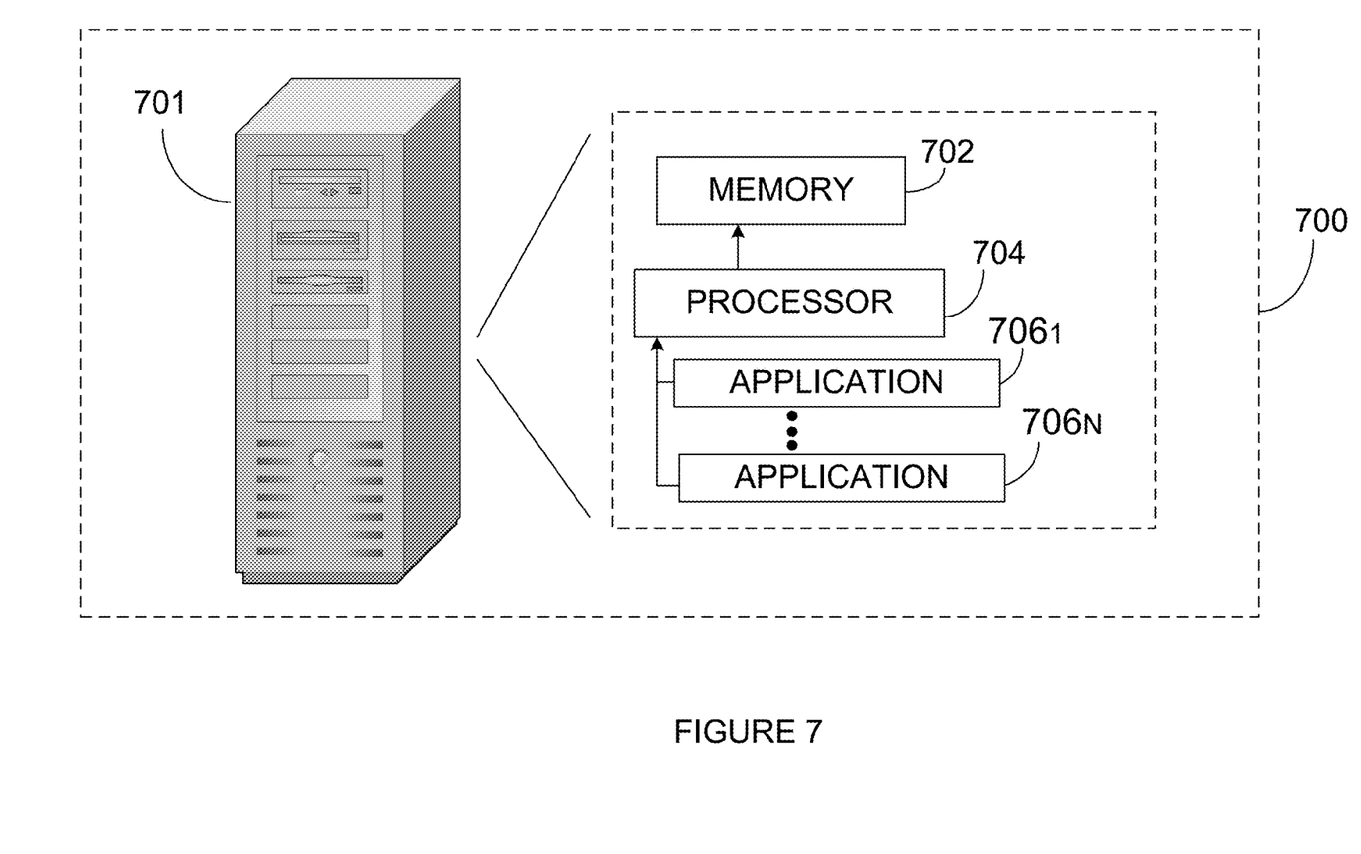
FIG. 7 is block diagram of an embodiment for implementing the estimator of FIG. 3 in a computing device.

In some embodiments, the estimator 300 may be implemented in hardware, using analog and/or digital circuit components, as illustrated in FIGS. 4 and 5. In some embodiments, the estimator 300 may be provided as an application-specific integrated circuit (ASIC) or a field programmable gate array (FPGA). In other embodiments, the estimator 300 may be implemented in software, as one or more applications running on a computing device 700, as illustrated in FIG. 7. The computing device 700 illustratively comprises one or more server(s) 701. The server 701 may comprise, amongst other things, a plurality of applications $706_1 \ldots 706_n$ running on a processor 704 coupled to a memory 702. The applications $706_1 \ldots 706_n$ are illustrated as separate entities but may be combined or separated in a variety of ways. For example, a first application may be used to implement the observer unit 302 while a second application may be used to implement the sensor dynamics unit 304. Alternatively, a single application may be used to implement both units 302, 304, or multiple applications may be used to implement each unit 302, 304.

The memory 702 accessible by the processor 704 may receive and store data. The memory 702 may be a main memory, such as a high speed Random Access Memory (RAM), or an auxiliary storage unit, such as a hard disk, a floppy disk, or a magnetic tape drive. The memory 702 may be any other type of memory, such as a Read-Only Memory (ROM), or optical storage media such as a videodisc and a compact disc. The processor 704 may access the memory 702 to retrieve data. The processor 704 may be any device that can perform operations on data. Examples are a central processing unit (CPU), a front-end processor, a microprocessor, and a network processor. The applications $706_1 \ldots 706_n$ are coupled to the processor 604 and configured to perform the tasks as described above and illustrated in FIGS. 1 and 2.

In some embodiments, the estimator 300 is implemented using a combination of hardware and software components. In some embodiments, the estimator 300 is provided as a non-transitory computer readable medium having stored thereon program code executable by a processor for carrying out the methods described herein.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The present disclosure may be embodied in other specific forms without departing from the subject matter of the claims. Also, one skilled in the relevant arts will appreciate that while the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A method for estimating a system parameter measured by a sensor of a gas turbine engine, the method comprising:
receiving, at an engine control system of the gas turbine engine, a measured parameter signal from the sensor, the measured parameter signal corresponding to a current measurement of the system parameter, the system parameter is temperature or pressure at a given location of the gas turbine engine; and
in a closed-loop scheme of the engine control system:
generating an estimated parameter signal based on the measured parameter signal and on past measurements of the system parameter obtained from the sensor;
outputting the estimated parameter signal as an estimate of the system parameter; and
iteratively correcting the estimated parameter signal using pre-characterized sensor dynamics for the sensor from which the system parameter is received until a steady state is reached, each corrected iteration of the estimated parameter signal being output as the estimated parameter signal.

2. The method of claim 1, wherein iteratively correcting the estimated parameter signal comprises:
calculating a model-based parameter signal from the estimated parameter signal using the sensor dynamics;
determining an estimation error by subtracting the model-based parameter signal from the measured parameter signal; and
applying the estimation error to the estimated parameter signal to obtain the estimated parameter signal as corrected.

3. The method of claim 1, wherein calculating the model-based parameter signal using the sensor dynamics comprises modeling the sensor using a first order system.

4. The method of claim 1, wherein the temperature sensor has a nonlinear characteristic modeled by piece-wise linearization throughout an operating envelop of the gas turbine engine.

5. The method of claim 1, wherein the given location is one of an inlet duct and an exhaust duct.

6. The method of claim 2, wherein steady state is reached when the estimation error is substantially zero.

7. The method of claim 2, wherein calculating a model-based parameter signal using the sensor dynamics comprises using bounded characteristics of the sensor, and wherein generating an estimated parameter signal and correcting the estimated parameter signal comprises maintaining the estimated parameter signal within the bounded characteristics of the sensor.

8. The method of claim 3, wherein the first order system is provided in accordance with:

$$H(s) = \frac{1}{\tau s + 1}$$

where $\tau$ is a time constant that varies from $\tau_{min}$ to $\tau_{max}$.

9. A device for estimating a system parameter measured by a sensor of a gas turbine engine, the device comprising:
at least one of:
(a) (i) a memory having stored thereon program code executable by a processor; and
(ii) at least one processor configured for executing the program code; and
(b) a circuit;
the at least one of (a) and (b) configured for:
receiving, at an engine control system of the gas turbine engine, a measured parameter signal from the sensor, the measured parameter signal corresponding to a current measurement of the system parameter, the system parameter is temperature or pressure at a given location of the gas turbine engine; and
in a closed-loop scheme of the engine control system:
generating an estimated parameter signal based on the measured parameter signal and on past measurements of the system parameter obtained from the sensor;
outputting the estimated parameter signal as an estimate of the system parameter; and
iteratively correcting the estimated parameter signal using pre-characterized sensor dynamics for the sensor from which the system parameter is received until a steady state is reached, each corrected iteration of the estimated parameter signal being output as the estimated parameter signal.

10. The device of claim 9, wherein iteratively correcting the estimated parameter signal comprises:
calculating a model-based parameter signal from the estimated parameter signal using the sensor dynamics;
determining an estimation error by subtracting the model-based parameter signal from the measured parameter signal; and
applying the estimation error to the estimated parameter signal to obtain the estimated parameter signal as corrected.

11. The device of claim 10, wherein steady state is reached when the estimation error is substantially zero.

12. The device of claim 9, wherein calculating the model-based parameter signal using the sensor dynamics comprises modeling the sensor using a first order system.

13. The device of claim 9, wherein the temperature sensor has a nonlinear characteristic modeled by piece-wise linearization throughout an operating envelop of the gas turbine engine.

14. The device of claim 9, wherein the given location is one of an inlet duct and an exhaust duct.

15. The device of claim 11, wherein calculating a model-based parameter signal using the sensor dynamics comprises using bounded characteristics of the sensor, and wherein generating an estimated parameter signal and correcting the estimated parameter signal comprises maintaining the estimated parameter signal within the bounded characteristics of the sensor.

16. The device of claim 12, wherein the first order system is provided in accordance with:

$$H(s) = \frac{1}{\tau s + 1}$$

where $\tau$ is a time constant that varies from $\tau_{min}$ to $\tau_{max}$.

* * * * *